United States Patent [19]

Dyer et al.

[11] Patent Number: 4,761,912
[45] Date of Patent: Aug. 9, 1988

[54] SNAIL TRAP

[76] Inventors: Robert L. Dyer, 6915 Camino De Gravia, San Diego, Calif. 92111; Lonnie C. Pogue, 821 Pismo Ct., San Diego, Calif. 92109

[21] Appl. No.: 48,213

[22] Filed: May 11, 1987

[51] Int. Cl.⁴ .............................................. A01M 1/10
[52] U.S. Cl. ........................................ 43/121; 43/131
[58] Field of Search ................... 43/121, 131, 132.1, 43/107

[56] References Cited

U.S. PATENT DOCUMENTS

| | | |
|---|---|---|
| 759,030 | 5/1904 | Sheaffer . |
| 1,443,287 | 1/1923 | Snyder et al. . |
| 1,573,278 | 2/1926 | Schlesinger ............................ 43/131 |
| 1,621,318 | 3/1927 | Edwards ................................ 43/121 |
| 1,887,771 | 11/1932 | Marsh ..................................... 43/121 |
| 1,960,464 | 5/1934 | Thalheimer ............................ 43/131 |
| 2,710,485 | 6/1955 | Stan ........................................ 43/131 |
| 3,303,600 | 2/1967 | Freeman ................................ 43/131 |
| 3,550,308 | 12/1970 | Ibach ..................................... 43/121 |
| 3,704,485 | 12/1972 | Hall ........................................ 19/65 |
| 3,704,539 | 12/1972 | Alvarez ................................. 43/131 |
| 3,772,820 | 11/1973 | Bond ..................................... 43/131 |
| 3,978,607 | 9/1976 | Piere ..................................... 43/131 |
| 4,035,946 | 7/1977 | Rapp et al. ............................ 43/131 |
| 4,251,946 | 2/1981 | Lindley ................................. 43/131 |
| 4,277,907 | 7/1981 | Ernest ................................... 43/131 |
| 4,328,637 | 5/1982 | Eichmuller ........................... 43/121 |
| 4,485,582 | 12/1984 | Morris ................................... 43/121 |
| 4,563,836 | 1/1986 | Woodruff .............................. 43/131 |

Primary Examiner—Kurt Rowan
Attorney, Agent, or Firm—Baker, Maxham & Jester

[57] ABSTRACT

A trap for snails, slugs and the like has a base and a top cover which fits over the base. The base has a central upwardly extending support defining an upwardly opening bait receptacle. The base further has an annular upwardly projecting wall surrounding the central support. A generally horizontal planar bottom member of the base extends between and connects a lower portion of the central support and a lower portion of the annular wall. The top cover has a generally horizontal planar disk element and an annular lip that extends downwardly from the periphery of the disk element. The top cover further has a plurality of reinforcing ribs that extend from the underside of the disk element. The top cover is configured and dimensioned so that it can fit on top of the base and engage the central support and annular wall thereof, with the annular lip positioned radially outward from the annular wall. An annular gap between the lip, the wall and the disk element is sufficient in size so that snails, slugs or the like can crawl over the annular wall, through the gap and into a concealed poison chamber defined by the bottom member, the central support, the annular wall and the disk element. The bait receptacle communicates with the chamber through a space between an upper end of the central support and the disk element so that the odor of a quantity of bait deposited therein can permeate the chamber.

17 Claims, 1 Drawing Sheet

SNAIL TRAP

BACKGROUND OF THE INVENTION

The present invention relates to apparatus for pest control, and more particularly, to an apparatus for killing and disposing of snails, slugs and the like.

In many areas of the country, snails and slugs do a substantial amount of damage to home landscaping and gardens. They are also unsightly and disturbing when accidentally stepped on. Many home owners use pelletized or powdered poisons in an attempt to reduce or eliminate the population of snails and slugs around their homes. However, such solid poisons are relatively expensive and must be frequently replenished where regular rains or water from sprinklers are prevalent. Liquid snail and slug poisons are also commercially available. However, both solid and liquid poisons present a hazard to children and pets. Also, many people do not want to risk contamination of their vegetable gardens by using such poisons. Widely dispersed shells of dead snails which result from poisons are difficult, if not impossible, to collect and dispose of. Furthermore, it is tedious to disperse snail and slug poisons around the area that is to be protected.

A snail and slug trap is the best alternative to eradication by poison. However, snail and slug traps which have heretofore been provided have been overly complex, difficult to install and empty, or not effective in attracting and killing such pests.

SUMMARY OF THE INVENTION

It is therefore the primary object of the present invention to provide an improved trap for snails, slugs and the like.

Another object of the present invention is to provide such an improved trap that is inexpensive to manufacture and is durable.

Another object of the present invention is to provide such an improved trap that is easy to install and to empty of dead snails.

Another object of the present invention is to provide such an improved trap that is more effective in both attracting and killing snails, slugs and the like.

Another object of the present invention is to provide such an improved trap that will conceal the poison therein from children and pets.

Another object of the present invention is to provide a trap for snails, slugs and the like that has a central bait receptacle surrounded by a poison chamber.

According to the illustrated embodiment of the present invention, a trap for snails, slugs and the like has a base and a top cover which fits over the base. The base has a central upwardly extending support defining an upwardly opening bait receptacle. The base further has an annular upwardly projecting wall surrounding the central support. A generally horizontal planar bottom member of the base extends between and connects a lower portion of the central support and a lower portion of the annular wall. The top cover has a generally horizontal planar disk element and an annular lip that extends downwardly from the periphery of the disk element. The top cover further has a plurality of reinforcing ribs that extend from the underside of the disk element. The top cover is configured and dimensioned so that it can fit on top of the base and engage the central support and annular wall thereof, with the annular lip positioned radially outward from the annular wall. An annular gap between the lip, the wall and the disk element is sufficient in size so that snails, slugs or the like can crawl over the annular wall, through the gap and into a concealed poison chamber defined by the bottom member, the central support, the annular wall and the disk element. The bait receptacle communicates with the chamber through a space between an upper end of the central support and the disk element so that the odor of a quantity of bait deposited therein can permeate the chamber.

BRIEF DESCRIPTION OF THE DRAWINGS

FIG. 1 is a perspective view of a preferred embodiment of our assembled trap for snails, slugs and the like.

DESCRIPTION OF THE PREFERRED EMBODIMENT

It is generally known that beer will attract snails. When snails crawl into a dish of beer, they become intoxicated and drown. As used herein, the term "bait" refers to beer or other substance that will attract snails. The term "poison" as used herein refers to any substance which is toxic to snails and will kill them when ingested by the snails or when it contacts the portions thereof unprotected by the shell.

Figure 5:
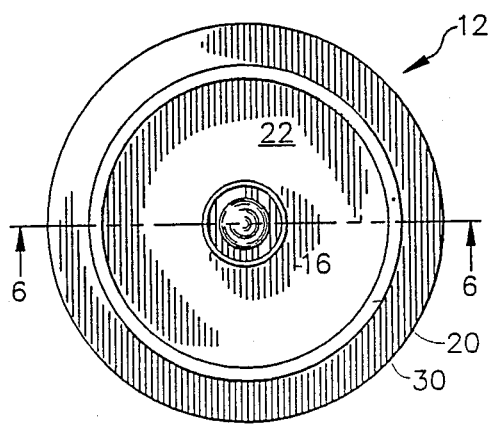
FIG. 5 is a plan view of the upper side of the base of the preferred embodiment.
Figure 6:
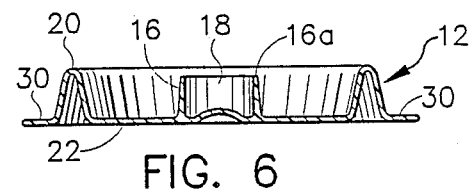
FIG. 6 is a sectional view of the base taken along line 6—6 of FIG. 5.

According to the illustrated embodiment of the present invention, a trap 10 (FIG. 1) for snails, slugs and the like has a base 12 and a top cover 14 which fits over the base. The base has a central upwardly extending support 16 (FIGS. 2, 5 and 6) defining an upwardly opening bait receptacle 18 (FIG. 6). The base further has an annular upwardly projecting wall 20 surrounding the central support. The wall 20 has an inverted V-shaped cross-section. A generally horizontal planar bottom member 22 of the base extends between and connects a lower portion of the central support 16 and a lower portion of the annular wall 20.

Figure 3:
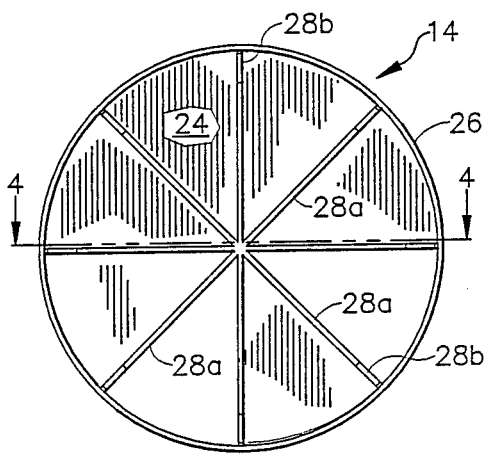
FIG. 3 is a plan view of the underside of the top cover of the preferred embodiment.
Figure 4:
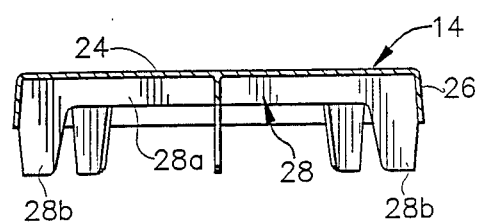
FIG. 4 is a sectional view of the top cover taken along line 4—4 of FIG. 3.

The top cover 14 has a generally horizontal planar disk element 24 (FIGS. 1, 3 and 4) and an annular lip 26 (FIGS. 2 and 4) that extends downwardly from the periphery of the disk element. The top cover 14 further has a plurality of reinforcing ribs 28 (FIGS. 2, 3 and 4) that extend diametrically from the underside of the disk element 24. Preferably there are four ribs so that the area of the disk element is divided into eight sectors. This provides adequate structural reinforcement without requiring undue thickness of the structure. Each of the ribs has an intermediate portion 28a (FIG. 4) and a pair of downwardly extending end portions or legs 28b which engage a ring-shaped flange 30 (FIGS. 2 and 6) connected to and extending radially outwardly from the annular wall 20 of the base 12. The innermost segments of the intermediate rib portions 28a rest on the upper end 16a (FIG. 6) of the central support as illustrated in FIG. 2.

Figure 1:
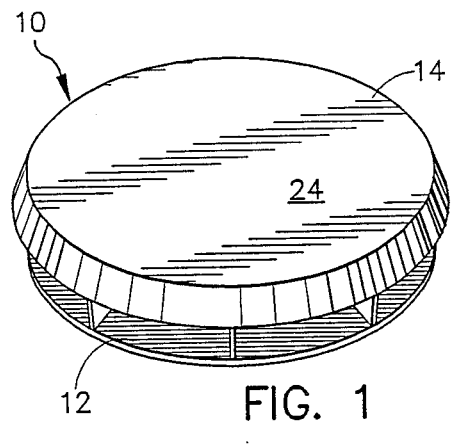
Figure 2:
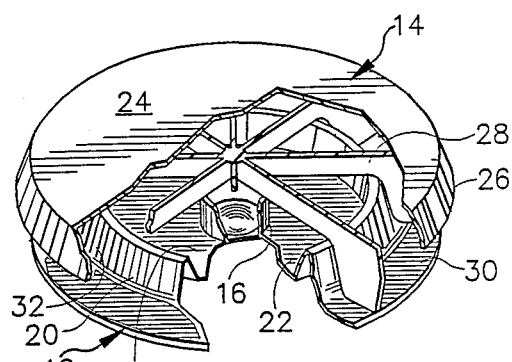
FIG. 2 is a view of my assembled trap similar to Fig. 1 but with portions broken away to show the internal construction thereof and the manner in which its base and top cover thereof fit together.

As best seen in FIGS. 1 and 2, the top cover 14 is configured and dimensioned so that it can fit on top of the base 12 and engage the central support 16 and annular wall 20. The bottom edges of the rib legs 28b (FIG. 4) also engage the ring-shaped flange 30 (FIG. 6) of the base 12 as illustrated in FIG. 2.

When the base 12 and cover 14 are assembled as illustrated in FIGS. 1 and 2, the annular lip 26 is positioned radially outward from the annular wall 20. An annular gap 32 (FIG. 2) between the lip 26, the wall 20 and the disk element 24 is sufficient in size so that snails, slugs or the like can crawl over the annular wall, through the gap 32 (between the ribs 28) and into a concealed poison chamber 34. This poison chamber is bounded by the bottom member 22, the central support 16, the annular wall 20 and the disk element 24. The bait receptacle 18 communicates with the chamber through a space between the upper end 16a (FIG. 6) of the central support and the disk element 24 spaced above the same by the rib portions 28 (See FIG. 2). The odor of a quantity of bait such as beer deposited in the receptacle 18 can permeate the chamber 34. This odor also permeates the region surrounding the trap 10 by passing through the annular gap 32 between the lip 26 of the top cover 14 and the annular wall 20 of the base 12. This odor attracts snail, slugs and the like into the poison chamber 34 where they are killed.

The base 12 and top cover 14 may be injection molded as single unitary pieces out of suitable pliant plastic material such as ABS plastic or polypropylene. The plastic is preferably green so that the trap will be camouflaged and not readily visible to the eye. When manufactured in large numbers, the trap is relatively inexpensive. It can be stepped on by a person and will not break. The vertical height of the assembled trap, i.e. the height of the combination of the cover fit on top of the base, is preferably less than one-quarter the horizontal diameter of the trap. This gives the trap a low-profile configuration that makes it inconspicuous and difficult to accidentally tip over.

Poison is concealed in the chamber 34, away from children and animals. Snails and slugs which are drawn into the trap cannot be stepped on once they have been killed because they cannot crawl out of the trap over the steeply inclined wall 20 after coming into contact with the poison. Clean up is made easy since a person can pick up the trap, remove the top cover, and then dump the dead pests into a garbage can. The base can be readily replenished with bait and poison.

Having described a preferred embodiment of our trap for snails, slugs and the like, it will be understood by those skilled in the art that our invention may be modified in both arrangement and detail. Therefore, the protection afforded our invention should only be limited in accordance with the scope of the following claims.

We claim:

1. A trap for snails, slugs and the like, comprising:
a base having a central upwardly extending support defining an upwardly opening bait receptacle, an annular upwardly projecting wall surrounding the central support, a generally horizontal planar bottom member extending between and connecting a lower portion of the central support and a lower portion of the annular wall, and a ring-shaped flange connected to the lower portion of the annular wall and extending radially outwardly therefrom; and
a top cover having a generally horizontal planar disk element, an annular lip extending downwardly from the periphery of the disk element, and a plurality of reinforcing ribs extending diametrically across the underside of the disk element, the ribs including downwardly extending legs, the top cover being configured and dimensioned so that it can fit on top of the base and engage the central support and annular wall thereof, with the annular lip positioned radially outward from the annular wall and the legs engaging the ring-shaped flange, and the annular wall positioned below the disk element to provide an annular gap therebetween of sufficient size so that snails, slugs or the like can crawl over the annular wall, through the gap and into a concealed poison chamber defined by the bottom member, the central support, the annular wall and the disk element, and with the bait receptacle communicating with the chamber through a space between an upper end of the central support and the disk element so that the odor of a quantity of bait deposited therein can permeate the chamber.

2. A trap according to claim 1 wherein the rib each have an intermediate portion and a pair of downwardly extending legs.

3. A trap according to claim 1 wherein ribs rest on top of an upper end of the central support.

4. A trap according to claim 1 wherein the annular wall has an inverted V-shaped configuration.

5. A trap according to claim 1 wherein the base and top cover are each made of a single injection molded piece of plastic.

6. A trap according to claim 1 wherein the vertical height of the combination of the cover fit on top of the base is less than one-quarter the horizontal diameter of the combination.

7. A trap according to claim 1 wherein there are four ribs that extend diametrically across the planar disk element.

8. A trap for snails, slugs and the like, comprising:
a base having a central upwardly extending support defining an upwardly opening bait receptacle, an annular upwardly projecting wall surrounding the central support and a generally horizontal planar bottom member extending between and connecting a lower portion of the central support and a lower portion of the annular wall; and
a top cover having a generally horizontal planar disk element, an annular lip extending downwardly from the periphery of the disk element, and a plurality of reinforcing ribs extending from the underside of the disk element, the top cover being configured and dimensioned so that it can fit on top of the base and the ribs will engage the central support and annular wall thereof, with the annular lip positioned radially outward from the annular wall, and the annular wall positioned below the disk element to provide an annular gap therebetween of sufficient size so that snails, slugs or the like can crawl over the annular wall, through the gap and into a concealed poison chamber defined by the bottom member, the central support, the annular wall and the disk element, and with the bait receptacle communicating with the chamber through a space between an upper end of the central support and the disk element so that the odor of a quantity of bait deposited therein can permeate the chamber.

9. A trap according to claim 8 wherein the ribs extend diametrically across the planar disk element.

10. A trap according to claim 9 wherein the ribs each have an intermediate portion and a pair of downwardly extending legs.

11. A trap according to claim 8 wherein the base further includes a ring-shaped flange connected to the lower portion of the annular wall and extending radially outwardly therefrom.

12. A trap according to claim 11 wherein the ribs extend diametrically across the the planar disk and include downwardly extending legs that engage the ring-shaped flange.

13. A trap according to claim 8 wherein the annular wall has an inverted V-shaped configuration.

14. A trap according to claim 8 wherein the vertical height of the combination of the cover fit on top of the base is less than one-quarter the horizontal diameter of the combination.

15. A trap for snails, slugs and the like, comprising:
a base having a central upwardly extending support defining an upwardly opening bait receptacle, an annular upwardly projecting wall having an inverted V-shaped configuration and surrounding the central support and a generally horizontal planar bottom member extending between and connecting a lower portion of the central support and a lower portion of the annular wall; and
a top cover having a generally horizontal planar disk element, an annular lip extending downwardly from the periphery of the disk element, and a plurality of reinforcing ribs extending from the underside of the disk element, the top cover being configured and dimensioned so that it can fit on top of the base and engage the central support and annular wall thereof, with the annular lip positioned radially outward from the annular wall, and the annular wall positioned below the disk element to provide an annular gap therebetween of sufficient size so that snails, slugs or the like can crawl over the annular wall, through the gap and into a concealed poison chamber defined by the bottom member, the central support, the annular wall and the disk element, and with the bait receptacle communicating with the chamber through a space between an upper end of the central support and the disk element so that the odor of a quantity of bait deposited therein can permeate the chamber.

16. A trap according to claim 15 wherein the base further includes a ring-shaped flange connected to the lower portion of the annular wall and extending radially outwardly therefrom, and the ribs extend diametrically across the planar disk and include downwardly extending legs that engage the ring-shaped flange.

17. A trap according to claim 15 wherein the vertical height of the combination of the cover fit on top of the base is less than one-quarter the horizontal diameter of the combination.

* * * * *